(12) United States Patent
Kimura

(10) Patent No.: US 9,068,564 B2
(45) Date of Patent: Jun. 30, 2015

(54) CRYOPUMP AND METHOD OF MONITORING CRYOPUMP

(75) Inventor: Toshiyuki Kimura, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 837 days.

(21) Appl. No.: 12/805,181

(22) Filed: Jul. 16, 2010

(65) Prior Publication Data

US 2015/0152856 A1 Jun. 4, 2015

(30) Foreign Application Priority Data

Jul. 16, 2009 (JP) .................. 2009-167436

(51) Int. Cl.
| | |
|---|---|
| B01D 8/00 | (2006.01) |
| F04B 37/08 | (2006.01) |
| F04D 19/04 | (2006.01) |
| F04B 37/14 | (2006.01) |
| F04B 49/06 | (2006.01) |
| F04D 27/00 | (2006.01) |

(52) U.S. Cl.
CPC ............... *F04B 37/08* (2013.01); *F04D 19/04* (2013.01); *F04B 37/14* (2013.01); *F04B 49/06* (2013.01); *F04D 27/00* (2013.01); *B01D 8/00* (2013.01)

(58) Field of Classification Search
CPC ...... F04B 37/08; F04B 37/085; F04B 49/065; F04B 2201/0801; F04B 2203/0205; F04B 2207/70–2207/704; F04B 37/14; F04B 49/06; B01D 8/00; F04D 27/00; F04D 19/04; Y10S 417/901
USPC .......................................................... 62/55.5
See application file for complete search history.

(56) References Cited

U.S. PATENT DOCUMENTS

| | | | | |
|---|---|---|---|---|
| 4,604,871 | A | * | 8/1986 | Chiu et al. ..................... 62/136 |
| 4,958,499 | A | * | 9/1990 | Haefner et al. ................ 62/55.5 |
| 5,054,294 | A | | 10/1991 | Dudley |
| 5,582,017 | A | * | 12/1996 | Noji et al. ...................... 62/55.5 |
| 6,060,987 | A | * | 5/2000 | Marlia ........................... 340/540 |
| 7,249,465 | B2 | * | 7/2007 | Arman et al. ...................... 62/6 |
| 2002/0104320 | A1 | * | 8/2002 | Gaudet et al. ................. 62/55.5 |

FOREIGN PATENT DOCUMENTS

| | | |
|---|---|---|
| JP | 04-255597 A | 9/1992 |
| JP | 06-301617 A | 10/1994 |

(Continued)

*Primary Examiner* — Mohammad M Ali
*Assistant Examiner* — Keith Raymond
(74) *Attorney, Agent, or Firm* — Fishman Stewart Yamaguchi PLLC

(57) ABSTRACT

A controller performs, while controlling a first stage cryopanel to have a target temperature: a first determination in which it is determined whether a second stage cryopanel has been heated to a temperature higher than or equal to an alert temperature set to be lower than a maximum temperature of the second stage cryopanel set in the vacuum apparatus; and a second determination in which it is determined whether the second stage cryopanel is continuously being heated, for a preset period of time or longer, to a temperature within a temperature range set on condition that the alert temperature is a maximum. The controller may perform, while controlling the first stage cryopanel to have a target temperature, a third determination in which it is determined whether a state where an error between the temperature of the second stage cryopump during a pumping operation and the minimum attained temperature thereof measured in the initial stage of an operation of the cryopump occurs, has been continued for a continued period of time or longer, the continued period of time being set to be longer than the preset period of time.

11 Claims, 3 Drawing Sheets

(56) References Cited

FOREIGN PATENT DOCUMENTS

| JP | 07-301178 A | 11/1995 |
| JP | 09-303861 A | 11/1997 |
| JP | 10-122144 A | 5/1998 |
| JP | 2000-018158 A | 1/2000 |
| JP | 2006-160538 A | 6/2006 |
| JP | 2009-156220 A | 7/2009 |

* cited by examiner

CRYOPUMP AND METHOD OF MONITORING CRYOPUMP

CROSS REFERENCES TO RELATED APPLICATIONS

The present document is based on Japanese Priority Document JP 2009-167436, filed in the Japanese Patent Office on Jul. 16, 2009, the entire contents of which being incorporated herein by reference.

BACKGROUND OF THE INVENTION

1. Field of the Invention

The present invention relates to a cryopump and a method of monitoring the cryopump.

2. Description of the Related Art

A cryopump is a vacuum pump that captures and pumps gas molecules by condensing or adsorbing molecules on a cryopanel cooled to an extremely low temperature. A cryopump is generally used to achieve a clean vacuum environment required in a semiconductor circuit manufacturing process.

For example, Japanese Patent Application Publication No. H6-301617 describes a production management system in which a plurality of production apparatuses, such as a sputtering apparatus, and the like, are connected with a central host computer via a LAN. Each production apparatus is provided with a cryopump, and an independent network, different from the network of the production apparatuses, is created among a plurality of cryopumps and a computer for maintenance management. Thereby, maintenance or management of the plurality of cryopumps is collectively performed.

However, in the aforementioned production management system, it is needed to newly install a computer for maintenance management and further to newly create another new network, thereby resulting in an increase in the cost for the system. Further, because the network is different from that of production apparatuses, the network is, after all, no more than a network for simply recording and managing operation states of the cryopumps, independently from the production apparatuses.

SUMMARY OF THE INVENTION

Therefore, a purpose of the present invention is to provide a cryopump and a method of monitoring the cryopump in which an operation state of the cryopump, which is suitable for a vacuum apparatus in which the cryopump is mounted, can be monitored by using e.g., an existing cryopump control device.

A cryopump according to an embodiment of the present invention is one that pumps gas from a vacuum chamber in a vacuum apparatus performing vacuum processing. The cryopump comprises: a first stage cryopanel; a controller configured to control the first stage cryopanel to have a target temperature; and a second stage cryopanel cooled to a lower temperature than the first stage cryopanel in conjunction with the temperature of the first stage cryopanel. The controller performs, while controlling the first stage cryopanel to have a target temperature: a first determination in which it is determined whether the second stage cryopanel has been heated to a temperature higher than or equal to an alert temperature set to be lower than a maximum temperature of the second stage cryopanel set in the vacuum apparatus; and a second determination in which it is determined whether the second stage cryopanel is continuously being heated, for a preset period of time or longer, to a temperature within a temperature range set on condition that the alert temperature is a maximum.

According to the embodiment, it can be preliminarily detected in the cryopump that the actual temperature of a cryopanel will reach the cryopanel maximum set temperature in the vacuum apparatus before actually reaching the temperature. By monitoring the cryopump under a monitoring condition made suitable for the setting of the vacuum apparatus, an accidental occurrence of down time of the vacuum apparatus can be suppressed to a minimum. Further, the possibility that the vacuum process may be adversely affected by the cryopump can be suppressed to a minimum.

The minimum of the temperature range may be set to be higher than a temperature zone in which it is assured that the vacuum processing is normally performed.

The controller may perform, while controlling the first stage cryopanel to have a target temperature, a third determination in which it is determined whether a state where an error between the temperature of the second stage cryopump during a pumping operation and the minimum attained temperature thereof measured in the initial stage of an operation of the cryopump occurs, has been continued for a continued period of time or longer, the continued period of time being set to be longer than the preset period of time.

A reference temperature by which it is determined whether an error between the temperature of the second stage cryopanel during a pumping operation and the minimum attained temperature thereof occurs, may be set to be lower than the minimum of the temperature range.

The continued period of time may be set to be longer than a period of time necessary for baking processing of the vacuum apparatus.

The cryopump may further comprise a refrigerator configured to generate a cold state by repeating heat cycles to cool the first stage and second stage cryopanels. The controller may perform the third determination by using a temperature of the second stage cryopanel, measured while the refrigerator is being operated at a cycle lower than the operating cycle of the refrigerator, the operating cycle being assumed to occur during the baking processing of the vacuum apparatus.

Another embodiment of the present invention is a method of monitoring a cryopump. The method is used for monitoring a cryopump that evacuates a vacuum apparatus performing vacuum processing. In the method, it is determined, while controlling the high-temperature cryopanel to have a target temperature, whether the temperature of a low-temperature cryopanel cooled in conjunction with a high-temperature cryopanel approaches the maximum temperature of the low-temperature cryopanel set in the vacuum apparatus; and when it is determined, while controlling the temperature of the high-temperature cryopanel, that the temperature of the low-temperature cryopanel does not approach the maximum temperature, it is determined whether an error between the temperature of the low-temperature cryopanel and a temperature zone in which it is assured that the vacuum processing is normally performed, continuously occurs.

It may be determined whether a state in which an error between the temperature of the low-temperature cryopanel in the cryopump and the minimum attained temperature thereof occurs, has been continued for a long period of time exceeding a determination reference period of time by which it is determined that an error between the temperature of the low-temperature cryopanel and the temperature zone has continuously occurred.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
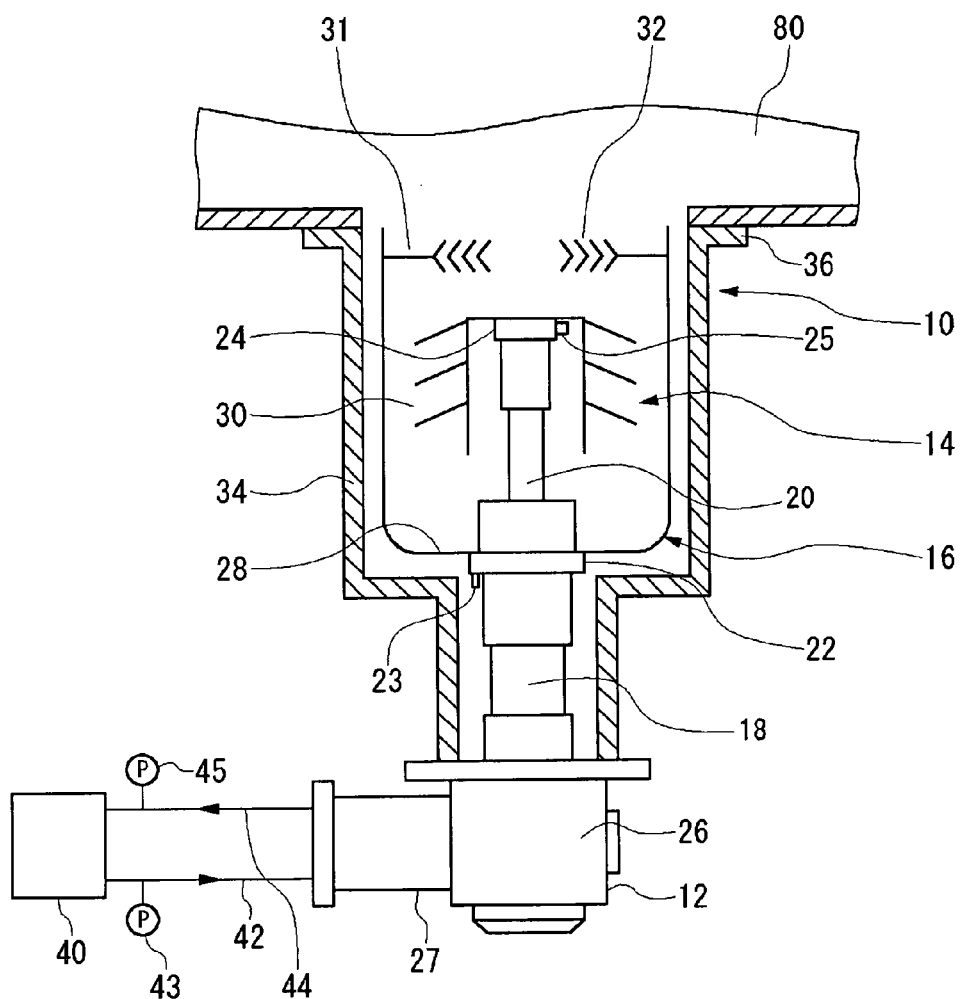
FIG. 1 is a cross-sectional view schematically illustrating a cryopump according to an embodiment of the present invention.

The invention will now be described by reference to the preferred embodiments. This does not intend to limit the scope of the present invention, but to exemplify the invention.

An outline of the following embodiments according to the present invention will be at first described. In an embodiment of the invention, a controller of a cryopump monitors an operation state of the cryopump under a plurality of monitoring conditions having time widths different from each other. The controller may monitor the cryopump by collectively using, for example: a first monitoring condition under which an operation state is monitored by a short-term time width; a second monitoring condition under which that is monitored by a middle-term time width; and a third monitoring condition under which that is monitored by a long-term time width. Herein, the monitoring condition means, for example, that a state in which the temperature of a cryopanel is raised to a temperature higher than a reference is continuing for a predetermined period of time or longer. In a short-term monitoring condition, it may be determined that the monitoring condition is satisfied when the temperature of a cryopanel has reached the reference. As a time width of a monitoring condition becomes longer, a constraint to an operation state (e.g., temperature reference) may be made stricter. For example, the determination-reference temperature in the second monitoring condition may be set to be lower than that in the first monitoring condition; and the determination-reference temperature in the third monitoring condition may be set to be further lower than that in the second monitoring condition. By setting monitoring conditions in phases as stated above, an error between an operation state and a normal state of the cryopump can be accurately detected.

The cryopump may comprise a plurality of cryopanels, each of which is cooled to a temperature different from each other, and for example, may comprise a low-temperature cryopanel and a high-temperature cryopanel. A controller may control one of the low-temperature and high-temperature cryopanels to have a target temperature and also monitor a state of the other cryopanel under the aforementioned monitoring conditions.

For example, when a heater for adjusting the temperature of a cryopanel is fixed to the cryopanel, continuation of a state in which a control command value for the heater (e.g., current) is smaller than a reference may be adopted as a monitoring condition, instead of directly measuring the temperature of the cryopanel. Alternatively, continuation of a state in which the operating cycle of the heat cycle of a refrigerator (hereinafter, simply referred to as an "operating cycle") exceeds a reference may be adopted as a monitoring condition instead of the temperature of a cryopanel.

The controller may memorize that at least one of a plurality of monitoring conditions has been satisfied, or may outputs a warning when a monitoring condition has been satisfied. It is because there is the possibility that the performance of the cryopump may be deteriorated when a monitoring condition has been satisfied. Accordingly, when at least one of a plurality of monitoring conditions has been satisfied, the controller may diagnose that the performance of the cryopump may be deteriorated and recommend maintenance of the cryopump.

In an embodiment, a controller of a cryopump controls the temperature of a cryopanel such that the volume of a vacuum chamber, etc., the volume being to be evacuated, has a target degree of vacuum. The controller provides an operation command to a refrigerator thermally connected with a cryopanel such that the actual temperature of the cryopanel follows a target temperature. The refrigerator generates a cold state by a heat cycle in which the refrigerator inhales an operating gas and discharges the gas that has been expanded inside the refrigerator. The controller uses, for example, the heat cycle frequency of the refrigerator as an operating command. In this case, the controller determines a command value of the heat cycle frequency such that the actual temperature of a cryopanel follows a target temperature, and provides the command value to the refrigerator. Thereby, the refrigerator is operated in accordance with the frequency command value while being operated normally.

The refrigerator includes a passage switching mechanism for periodically switching the passage for the operating gas in order to periodically repeat inhale and discharge of the operating gas. The passage switching mechanism includes, for example, a valve portion and a drive portion for driving the valve portion. The valve portion is, for example, a rotary valve, and the drive portion is a motor for rotating the rotary valve. The motor may be, for example, an AC motor or a DC motor. The passage switching mechanism may be a direct acting mechanism driven by a linear motor.

The controller may determine a command value for a rotational speed of a motor instead of determining a command value for the heat cycle frequency. In the case of a so-called direct drive method in which a rotational output of a motor is directly transmitted to a valve portion, the rotational speed of a motor matches the heat cycle frequency. When a motor is connected with a valve portion via a power transmission mechanism including reduction gears, etc., there is a certain relationship between the rotational speed of a motor and the heat cycle frequency. In this case, the controller determines, as a command value, a rotational speed of a motor corresponding to the heat cycle frequency necessary for making the temperature of a cryopanel follow a target temperature, and provides the command value to the refrigerator. Alternatively, when the refrigerator comprises a direct acting passage switching mechanism including a linear motor, the controller determines, as a command value, a frequency of the reciprocating movement of the linear motor corresponding to the heat cycle frequency necessary for making the temperature of a cryopanel follow a target temperature, and provides the command value to the refrigerator. In the following descriptions, for convenience, a rotational speed of a rotary motor and a frequency of the reciprocating movement of a linear motor are collectively referred to as an operating frequency of a motor in some cases.

In an embodiment, a cryopump is fixed to a vacuum chamber in a vacuum apparatus in order to pump gas from the vacuum chamber. The vacuum apparatus is used for performing desired vacuum processing, and examples thereof include, for example, film-forming apparatuses, such as a sputtering apparatus, a CVD apparatus, and a vacuum evaporation apparatus; and other semiconductor manufacturing apparatuses requiring vacuum environments. In a device manufacturing system including a vacuum apparatus, it is normally considered that a vacuum apparatus is a superior apparatus and a cryopump is one inferior to that.

Apart from the controller of the cryopump, a vacuum apparatus is normally provided with a controller for executing and managing a desired vacuum process. The controller of the vacuum apparatus and the controller of the cryopump may be communicatably connected with each other via an appropriate interface or a network. However, the controller of the vacuum apparatus is not usually configured to directly control an operation of the cryopump.

However, a limit value of the temperature of a cryopanel may be set in the controller of the vacuum apparatus in order to display a warning or to discontinue a vacuum process when the temperature of a cryopanel is abnormally raised. The panel limit temperature set in the vacuum apparatus is, for example, a temperature from which it can be clearly considered that a malfunction has occurred in the cryopump. Accordingly, it can be assumed that the cryopump in the vacuum apparatus is being normally operated as long as the temperature of a cryopanel has not reached the panel limit temperature.

A controller of the vacuum apparatus determines whether an input temperature exceeds a limit temperature after receiving an input of a panel temperature from the cryopump. When exceeding the limit temperature, the controller outputs a warning or discontinues a vacuum process under execution. When a vacuum process is discontinued immediately after the temperature of a cryopanel has reached the panel limit temperature, there accidently occurs down time of the vacuum apparatus. Such an accidental occurrence of down time is not preferred in terms of a planned process execution schedule being hampered. Then, it is preferable that a monitoring function or a self-diagnose function is installed in the cryopump to monitor an operating state of the cryopump.

In an embodiment, a controller of a cryopump may determine, while controlling a high-temperature cryopanel to have a target temperature, whether the temperature of a low-temperature cryopanel cooled in conjunction with the high-temperature cryopanel approaches the maximum temperature of the low-temperature cryopanel set in the vacuum apparatus. Specifically, the controller of the cryopump may determine whether a cryopanel is heated to, for example, a temperature higher than or equal to an alert temperature set to be lower than the maximum temperature of a cryopanel set in the vacuum apparatus. The controller may outputs a warning and display the warning on the associated display portion when a cryopanel is heated to a temperature higher than or equal to the alert temperature.

With such a structure, it can be detected beforehand in the cryopump that there is the possibility that the actual temperature of a cryopanel may reach the cryopanel maximum set temperature in the vacuum apparatus. Thereby, the vacuum apparatus can be suitably dealt with, for example, in the next maintenance. By monitoring the cryopump under a monitoring condition made suitable for the setting of the vacuum apparatus, an accidental occurrence of down time of the vacuum apparatus can be suppressed to a minimum.

Further, the controller of the cryopump may determine, while controlling the temperature of the high-temperature cryopanel, whether an error between the temperature of the low-temperature cryopanel and a temperature zone in which it is assured that vacuum processing is normally performed (hereinafter, also referred to as a "vacuum process assured temperature zone") continuously occurs. For example, the controller may determine whether the low-temperature cryopanel is continuously being heated to a temperature within a temperature range for a preset period of time or longer, the temperature range being set on condition that the aforementioned alert temperature is a maximum. Therefore, the alert temperature may be set to be higher than the vacuum process assured temperature zone.

It is not dependent only on the temperature of a cryopanel, but also on various parameters, for example, such as pressure in the chamber, temperature in the chamber, flow rate of a process gas, discharge current, and film-forming material, whether a vacuum process is normally performed. Rather, there is the possibility that the temperature of a cryopanel may not provide a major influence on the process in comparison with other factors. Accordingly, it cannot be always said that, even when an error between the temperature of a cryopanel and the process assured temperature zone occurs, there immediately occurs a malfunction in the process. However, when an error between the temperature of a cryopanel and the process assured temperature zone continuously occurs, it cannot be denied the possibility that a certain extent of influence may occur. By monitoring the cryopump under a monitoring condition made suitable for a vacuum process in which the cryopump executes a pumping operation, the possibility that the vacuum process may be adversely affected by the cryopump can be suppressed to a minimum.

The controller of the cryopump may determine, while controlling the temperature of the high-temperature cryopanel, whether a state in which an error between the temperature of the low-temperature cryopanel and the minimum attained temperature thereof occurs, has been continued for a long period of time. For example, the controller may determine whether a state in which an error between the temperature of the low-temperature cryopanel during a pumping operation and the minimum attained temperature thereof measured in the initial stage of an operation of the cryopump occurs, has been continued for a predetermined continued period of time or longer. A reference temperature by which it is determined whether an error between the temperature of the low-temperature cryopanel during a pumping operation and the minimum attained temperature in the initial stage of an operation of the cryopump occurs, may be set in the vacuum process assured temperature zone.

A state in which the temperature of the low-temperature cryopanel is within the vacuum process assured temperature zone is a normal state. However, there is a certain degree of variation in the minimum attained temperatures of a cryopanel, depending on individual differences of the cryopump. There is a tendency in which, as the accumulative operating period of time of the cryopump becomes long, the minimum attained temperature is gently increased in comparison with that in the initial stage of an operation thereof. It is preferable that the minimum attained temperature in the initial stage of an operation has been low temperature, because it can be expected that the temperature of a cryopanel may remain within the vacuum process assured temperature zone for a long period of time. However, even if the temperature of the low-temperature cryopanel is within a normal range, there is the possibility that aging degradation of the cryopump may have been in progress when an error from the minimum attained temperature in the initial stage is expanded. Due to the progress in the aging degradation, a risk of occurrence of a malfunction becomes high. By monitoring an error between the temperature of the low-temperature cryopanel and the minimum attained temperature in the initial stage of an operation, it can be sped up to confirm a state of the cryopump before an adverse influence on the vacuum process comes to the surface.

Hereinafter, preferred embodiments for carrying out the present invention will be further described in detail with reference to the drawings. FIG. 1 is a cross-sectional view schematically illustrating a cryopump 10 according to an embodiment of the present invention.

The cryopump 10 is mounted in a vacuum chamber 80 of an apparatus, such as an ion implantation apparatus and a sputtering apparatus, that requires a high vacuum environment. The cryopump 10 is used to enhance the degree of vacuum in the vacuum chamber 80 to a level required in a requested process. For example, the cryopump 10 achieves a high degree of vacuum of about $10^{-5}$ Pa or about $10^{-8}$ Pa.

The cryopump 10 is provided with a first cryopanel cooled to a first cooling temperature level and a second cryopanel cooled to a second cooling temperature level lower than the first cooling temperature level. The first cryopanel condenses and captures a gas having a low vapor pressure, e.g. a vapor pressure lower than a reference vapor pressure (e.g., $10^{-8}$ Pa) at the first cooling temperature level so as to pump the gas accordingly. The second cryopanel condenses and captures a gas having a low vapor pressure at the second cooling temperature level so as to pump the gas accordingly. In order to capture a non-condensable gas that cannot be condensed at the second temperature level due to a high vapor pressure, an adsorption area is formed on the surface of the second cryopanel. The adsorption area is formed by, for example, providing an adsorbent on the panel surface. A non-condensable gas is adsorbed by the adsorption area cooled to the second temperature level and pumped.

The cryopump 10 illustrated in FIG. 1 is provided with a refrigerator 12, a panel assembly 14 and a heat shield 16. The panel assembly 14 includes a plurality of cryopanels, which are cooled by the refrigerator 12. A cryogenic temperature surface for capturing gas by condensation or adsorption so as to pump the gas, is formed on the panel surface. The surface (e.g., rear face) of the cryopanel is normally provided with an adsorbent such as activated carbon or the like in order to adsorb gas.

The cryopump 10 is a so-called vertical-type cryopump, where the refrigerator 12 is inserted and arranged along the axial direction of the heat shield 16. The present invention is also applicable to a so-called horizontal-type cryopump alike, where the second cooling stage of the refrigerator is inserted and arranged in the (usually orthogonal) direction intersecting with the axial direction of the heat shield 16.

The refrigerator 12 is a Gifford-McMahon refrigerator (so-called GM refrigerator). The refrigerator 12 is a two-stage refrigerator comprising a first stage cylinder 18, a second stage cylinder 20, a first cooling stage 22, a second cooling stage 24 and a refrigerator motor 26. The first stage cylinder 18 and the second stage cylinder 20 are connected in series, in which a first stage displacer and a second stage displacer (not illustrated), which are connected together, are respectively built in. A regenerator is incorporated into the first stage displacer and the second stage displacer. The refrigerator 12 may be one other than the two-stage GM refrigerator, for example, a single-stage GM refrigerator or a pulse tube refrigerator may be used.

The refrigerator motor 26 is provided at one end of the first stage cylinder 18. The refrigerator motor 26 is provided inside a motor housing 27 formed at the end portion of the first stage cylinder 18. The refrigerator motor 26 is connected to the first stage displacer and the second stage displacer such that the first stage displacer and the second stage displacer can reciprocally move inside the first stage cylinder 18 and the second stage cylinder 20, respectively. The refrigerator motor 26 is connected to a movable valve (not illustrated) provided inside the motor housing 27 such that the valve can move in the forward direction and the reverse direction.

The first cooling stage 22 is provided at the end portion of the first stage cylinder 18 on the second stage cylinder 20 side, i.e., at the connecting portion between the first stage cylinder 18 and the second stage cylinder 20. The second cooling stage 24 is provided at the terminal portion of the second stage cylinder 20. The first cooling stage 22 and the second cooling stage 24 are respectively fixed to the first stage cylinder 18 and the second stage cylinder 20 by, for example, brazing.

The compressor 40 is connected to the refrigerator 12 through a high pressure piping 42 and a low pressure piping 44. The high pressure piping 42 and the low pressure piping 44 are provided with a first pressure sensor 43 and a second pressure sensor 45 for measuring pressure of the operating gas, respectively. Instead of respectively providing pressure sensors in the high pressure piping 42 and the low pressure piping 44, it is possible that a differential pressure sensor, which is used for measuring a differential pressure between the high pressure piping 42 and the low pressure piping 44, is provided in a passage provided for connecting the two pipings 42 and 44 together.

The refrigerator 12 expands within it an operating gas (e.g., helium) with a high pressure supplied from the compressor 40 so as to generate a cold state at the first cooling stage 22 and the second cooling stage 24. The compressor 40 recovers the operating gas expanded inside the refrigerator 12 and repressurize the gas to supply to the refrigerator 12.

Specifically, the operating gas with a high pressure is supplied to the refrigerator 12 from the compressor 40 through the high pressure piping 42. At the time, the refrigerator motor 26 drives the movable valve inside the motor housing 27 such that the high pressure piping 42 and the inside space of the refrigerator 12 are connected to each other. When the inside space of the refrigerator 12 is filled with the operating gas with a high pressure, the inside space of the refrigerator 12 is connected to the low pressure piping 44 with the refrigerator motor 26 switching the movable valve. Thereby, the operating gas is expanded and recovered into the compressor 40. Synchronized with the operation of the movable valve, the first stage displacer and the second stage displacer reciprocally move inside the first stage cylinder 18 and the second stage cylinder 20, respectively. By repeating such heat cycles, the refrigerator 12 generates cold states in the first cooling stage 22 and the second cooling stage 24. In the compressor 40, compression cycles in which the operating gas discharged from the refrigerator 12 is compressed to a high pressure and delivered into the refrigerator 12, are repeated.

The second cooling stage 24 is cooled to a temperature lower than that of the first cooling stage 22. The second cooling stage 24 is cooled to, for example, approximately 10 K to 20 K, while the first cooling stage is cooled to, for example, approximately 80 K to 100 K. A first temperature sensor 23 is mounted in the first cooling stage 22 in order to measure a temperature thereof, and a second temperature sensor 25 is mounted in the second cooling stage 24 in order to measure a temperature thereof.

The heat shield 16 is fixed to the first cooling stage 22 of the refrigerator 12 in a thermally connected state, while the panel assembly 14 is connected to the second cooling stage 24 thereof in a thermally connected state. Thereby, the heat shield 16 is cooled to a temperature nearly equal to that of the first cooling stage 22, while the panel assembly is cooled to a temperature nearly equal to that of the second cooling stage 24.

The heat shield 16 is provided to protect the panel assembly 14 and the second cooling stage 24 from ambient radiation heat. The heat shield 16 is formed into a cylindrical shape having an opening 31 at its one end. The opening 31 is defined by the interior surface at the end of the cylindrical side face of the heat shield 16.

On the other hand, on the side opposite to the opening 31, i.e., at the other end on the pump bottom side, of the heat shield 16, an occluded portion 28 is formed. The occluded portion 28 is formed by a flange portion extending toward the inside of the radial direction at the end portion on the pump bottom side of the cylindrical side face of the heat shield 16. As the cryopump 10 illustrated in FIG. 1 is a vertical-type cryopump, the flange portion is mounted in the first cooling stage 22 of the refrigerator 12. Thereby, a cylindrically-shaped inside space 30 is formed within the heat shield 16. The refrigerator 12 protrudes into the inside space 30 along the central axis of the heat shield 16, and the second cooling stage 24 remains inserted in the inside space 30.

In the case of a horizontal-type cryopump, the occluded portion 28 is usually occluded completely. The refrigerator 12 is arranged so as to protrude into the inside space 30 along the direction orthogonal to the central axis of the heat shield 16 from the opening for attaching the refrigerator, formed on the side face of the heat shield 16. The first cooling stage 22 of the refrigerator 12 is mounted in the opening for attaching the refrigerator in the heat shield 16, while the second cooling stage 24 thereof is arranged in the inside space 30. In the second cooling stage 24, is mounted the panel assembly 14. Therefore, the panel assembly 14 is arranged in the inside space 30 of the heat shield 16. Alternatively, the panel assembly 14 may be mounted in the second cooling stage 24 through an appropriately-shaped panel mounting member.

The heat shield 16 may not be cylindrical in shape but may be a tube having a rectangular, elliptical, or any other cross section. Typically, the shape of the heat shield 16 is analogous to the shape of the interior surface of a pump case 34. The heat shield 16 may not be formed as a one-piece cylinder as illustrated. A plurality of parts may form a cylindrical shape as a whole. The plurality of parts may be provided so as to create a gap between the parts.

A baffle 32 is provided in the opening 31 of the heat shield 16. The baffle 32 is provided spaced apart from the panel assembly 14 in the direction of the central axis of the heat shield 16. The baffle 32 is mounted in the end portion on the opening 31 side of the heat shield 16, and is cooled to a temperature nearly equal to that of the heat shield 16. The baffle 32 may be formed, for example, concentrically, or into other shapes such as a lattice shape, etc., when seen from the vacuum chamber 80 side. A gate valve (not illustrated) is provided between the baffle 32 and the vacuum chamber 80. The gate valve is, for example, closed when the cryopump 10 is regenerated and opened when the vacuum chamber 80 is evacuated by the cryopump 10.

The heat shield 16, the baffle 32, the panel assembly 14, and the first cooling stage 22 and the second cooling stage 24 of the refrigerator 12, are contained inside the pump case 34. The pump case 34 is formed by connecting in series two cylinders, diameters of which are different from each other. The end portion of the cylinder with a larger diameter is opened, and a flange portion 36 for connection with the vacuum chamber 80 is formed extending toward the outside of the radial direction. The end portion of the cylinder with a smaller diameter of the pump case 34 is fixed to the motor housing 27. The cryopump 10 is fixed to an evacuation opening of the vacuum chamber 80 in an airtight manner through the flange portion 36 of the pump case 34, allowing an airtight space integrated with the inside space of the vacuum chamber 80 to be formed.

The pump case 34 and the heat shield 16 are both formed into cylindrical shapes and arranged concentrically. Because the inner diameter of the pump case 34 is slightly larger than the outer diameter of the heat shield 16, the heat shield 16 is arranged slightly spaced apart from the interior surface of the pump case 34.

Figure 2:
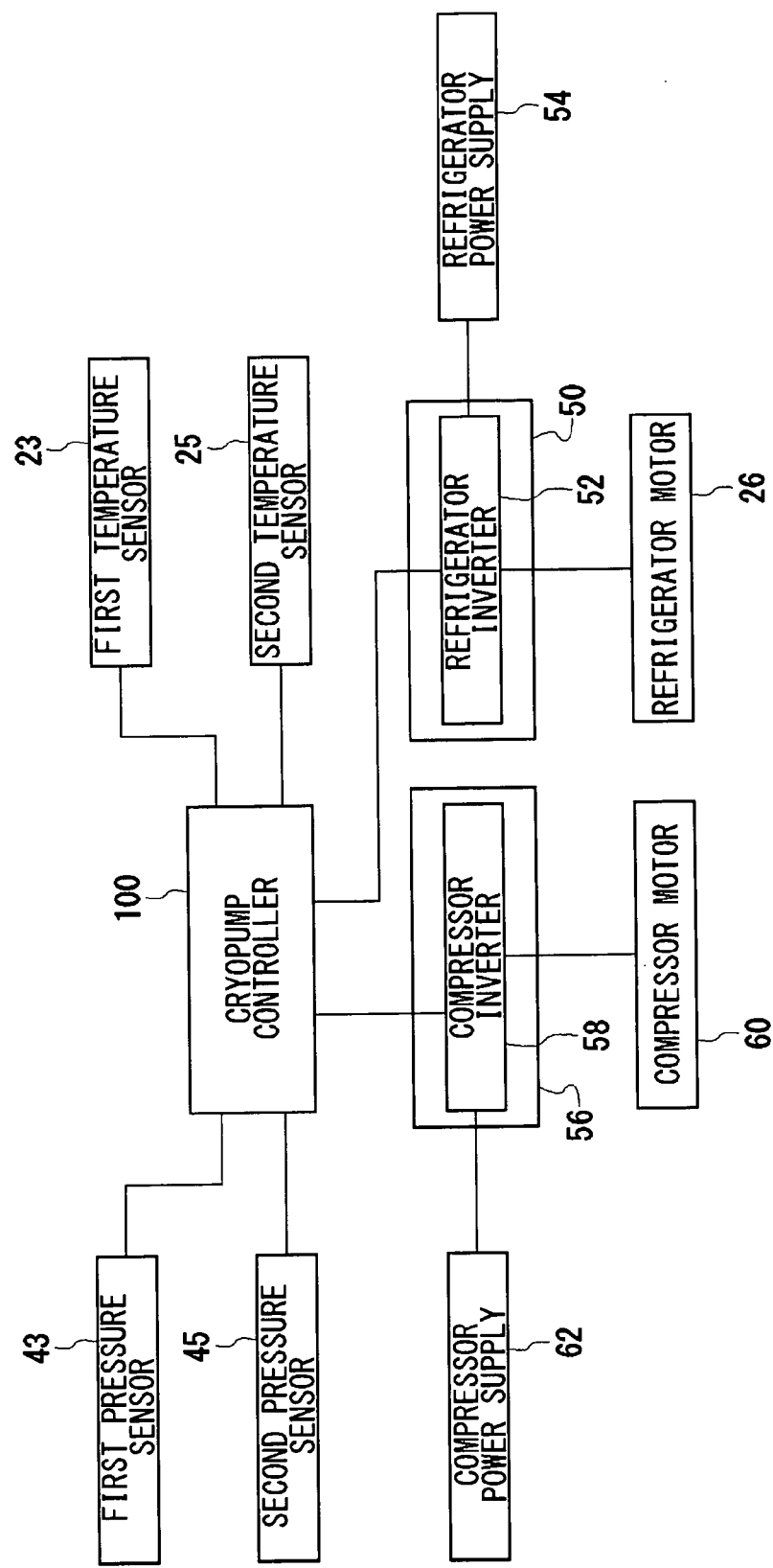
FIG. 2 is a control block view with respect to the cryopump according to the present embodiment.

FIG. 2 is a control block view with respect to the cryopump 10 according to the present embodiment. A cryopump controller (hereinafter, also referred to as a CP controller) 100, which is used for controlling the cryopump 10 and the compressor 40, is provided associated with the cryopump 10. The CP controller 100 comprises: a CPU performing various arithmetic processing, a ROM storing various control programs, a RAM used as a work area for storing data and executing programs, an input/output interface, and a memory, etc. The CP controller 100 may be configured to be integrated with the cryopump 10, or configured separately from the cryopump 10 to be operable to communicate with each other.

In FIGS. 1 and 2, a vacuum evacuation system provided with each one of the cryopump 10 and the compressor 40 is illustrated; however, a vacuum evacuation system provided with a plurality of the cryopumps 10 and a plurality of the compressors 40, respectively, may also be configured. To attain such system, the CP controller 100 may be configured such that a plurality of the cryopumps 10 and a plurality of the compressors 40 can be connected thereto.

To the CP controller 100, are connected the first temperature sensor 23 for measuring a temperature of the first cooling stage of the refrigerator 12 and the second temperature sensor 25 for measuring a temperature of the second cooling stage thereof. The first temperature sensor 23 periodically measures a temperature of the first cooling stage 22 to output a signal indicating the measured temperature to the CP controller 100. The second temperature sensor 25 periodically measures a temperature of the second cooling stage 24 to output a signal indicating the measured temperature to the CP controller 100. The measured values obtained by the first temperature sensor 23 and the second temperature sensor 25 are inputted to the CP controller 100 at predetermined intervals and stored in a predetermined storage area of the CP controller 100.

To the CP controller 100, are connected a first pressure sensor 43 used for measuring an operating gas pressure on the discharge side, i.e., on the high pressure side of the compressor 40, and a second pressure sensor 45 used for measuring an operating gas pressure on the inhale side, i.e., on the low pressure side of thereof. The first pressure sensor 43 periodically measures, for example, a pressure in the high pressure piping 42 to output a signal indicating the measured pressure to the CP controller 100. The second pressure sensor 45 periodically measures, for example, a pressure in the low pressure piping 44 to output a signal indicating the measured pressure to the CP controller 100. The measured values obtained by the first pressure sensor 43 and the second pressure sensor 45 are inputted to the CP controller 100 at predetermined intervals and stored in a predetermined storage area of the CP controller 100.

The CP controller 100 is connected to a refrigerator frequency converter 50 so as to be operable to communicate therewith. The refrigerator frequency converter 50 and the refrigerator motor 26 are connected to each other so as to be operable to communicate with each other. The CP controller 100 transmits a control command to the refrigerator frequency converter 50. The refrigerator frequency converter 50 is configured to include a refrigerator inverter 52. The refrigerator frequency converter 50 is supplied with electric power with the specified voltage and frequency from a refrigerator power supply 54, and supplies the electric power to the refrigerator motor 26 after adjusting the voltage and frequency of the supplied electric power based on the control command issued by the CP controller 100.

The CP controller 100 is connected to a compressor frequency converter 56 so as to be operable to communicate therewith. The compressor frequency converter 56 and a compressor motor 60 are connected to each other so as to be operable to communicate with other. The CP controller 100 transmits a control command to the compressor frequency converter 56. The compressor frequency converter 56 is configured to include a compressor inverter 58. The compressor frequency converter 56 is supplied with electric power with the specified voltage and frequency from a compressor power supply 62, and supplies the electric power to the compressor motor 60 after adjusting the voltage and frequency of the supplied electric power based on the control command transmitted by the CP controller 100. In the embodiment illustrated in FIG. 2, the refrigerator power supply 54 and the compressor power supply 62 are provided separately for each of the refrigerator 12 and the compressor 40; however, a common power supply between the refrigerator 12 and the compressor 40 may be provided.

The CP controller 100 controls the refrigerator 12 based on a temperature of the cryopanel. The CP controller 100 issues the operation command to the refrigerator 12 such that a temperature of the cryopanel follows the target temperature. For example, the CP controller 100 controls an operating frequency of the refrigerator motor 26 by performing feedback control so as to minimize the deviation between the target temperature of the cryopanel at the first stage and the measured temperature obtained by the first temperature sensor 23. The target temperature of the cryopanel at the first stage is determined as a specification, for example, in accordance with a process carried out in the vacuum chamber 80. In this case, the second cooling stage 24 and the panel assembly 14 of the refrigerator 12 are cooled to a temperature determined by the specification of the refrigerator 12 and a heat load from outside. The CP controller 100 determines an operating frequency of the refrigerator motor 26 (e.g., rotational speed of the motor) such that the temperature of the cryopanel at the first stage follows the target temperature, and outputs a command value for the motor operating frequency to the refrigerator inverter 52. The CP controller 100 may control an operating frequency of the refrigerator motor 26 such that the temperature of the cryopanel at the second stage follows the target temperature.

Thereby, if the measured temperature obtained by the first temperature sensor 23 is higher than the target temperature, the CP controller 100 outputs a command value to the refrigerator frequency converter 50 so as to increase the operating frequency of the refrigerator motor 26. In response to the increase in the motor operating frequency, the heat cycle frequency in the refrigerator 12 is increased, allowing the first cooling stage 22 of the refrigerator 12 to be cooled toward the target temperature. In contrast, if the measured temperature obtained by the first temperature sensor 23 is lower than the target temperature, the operating cycle of the refrigerator motor 26 is decreased, allowing the first cooling stage 22 of the refrigerator 12 to be heated toward the target temperature.

The target temperature of the first cooling stage 22 is usually set to a constant value. Therefore, the CP controller 100 outputs, when a heat load on the cryopump 10 is increased, a command value so as to increase the operating frequency of the refrigerator motor 26, while outputs, when a heat load on the cryopump 10 is decreased, a command value so as to decrease the operating frequency thereof. The target temperature may be arbitrarily varied, for example, the target temperature of the cryopanel may be sequentially set so as to attain a target ambient pressure in the volume to be evacuated.

In a typical cryopump, the heat cycle frequency is always maintained at a constant value. The heat cycle frequency is set so as to operate the cryopump with a relatively larger frequency such that rapid cooling from room temperature to the temperature at which the pump operates, can be attained. If a heat load from outside is small, the temperature of the cryopanel is adjusted by heating with a heater, causing consumed electric power to be large. In contrast, in the present embodiment, the heat cycle frequency is controlled in accordance with a heat load on the cryopump 10, and hence a cryopump excellent in energy saving can be realized. Further, there is no need for providing a heater, which also contributes to reduction of the consumed power.

The CP controller 100 controls the frequency of the compression cycle executed in the compressor 40 so as to maintain a differential pressure (hereinafter, sometimes referred to as a compressor differential pressure) between the pressures at the inlet port and the outlet port of the compressor 40, at the target pressure. For example, the CP controller 100 controls the compression cycle frequency by performing feedback control so as to maintain the differential pressure between the pressures at the inlet port and the outlet port of the compressor 40, at a constant value. Specifically, the CP controller 100 determines the compressor differential pressure from the measured values obtained by the first pressure sensor 43 and the second pressure sensor 45. The CP controller 100 determines an operating frequency of the compressor motor 60 (e.g., rotational speed of the motor) such that the compressor differential pressure is to be equal to the target value, and outputs a command value for the motor operating frequency to the compressor frequency converter 56.

With such a constant differential pressure control method, consumed power can be further reduced. If heat loads on the cryopump 10 and the refrigerator 12 are small, the heat cycle frequency in the refrigerator 12 is small due to the aforementioned temperature control of the cryopanel. Then, a flow rate of the operating gas required in the refrigerator 12 becomes small, therefore the differential pressure between the pressures at the inlet port and the outlet port of the compressor 40 will become large. In the embodiment, however, the operating frequency of the compressor motor 60 is controlled so as to maintain the compressor differential pressure at a constant value, allowing the compression cycle frequency to be adjusted. Therefore, an operating frequency of the compressor motor 60 becomes small in this case. Accordingly, consumed power can be more reduced as compared to the case where the compression cycle is always maintained at a constant value like a typical cryopump.

On the other hand, if a heat load on the cryopump 10 becomes large, the operating frequency and the compression cycle frequency of the compressor motor 60 are increased so as to maintain the compressor differential pressure at a constant value. Hence, a flow rate of the operating gas flowing into the refrigerator 12 can be sufficiently secured, allowing an error between a cryopanel temperature and the target temperature, occurring due to the increase in the heat load, to be suppressed to a minimum.

The operation of the cryopump 10 with the aforementioned configuration will be described below. In operating the cryopump 10, the inside of the vacuum chamber 80 is evacuated to the degree of approximately 1 Pa by using other appropriate roughing pump prior to its operation. Subsequently the cryopump 10 is operated. The first cooling stage 22 and the second cooling stage 24 are cooled by driving the refrigerator 12, allowing the heat shield 16, the baffle 32 and the panel assembly 14, which are thermally connected to the stages, also to be cooled.

The cooled baffle 32 cools gas molecules flying toward the inside of the cryopump 10 from the vacuum chamber 80 to condense gas (e.g., moisture), vapor pressure of which is sufficiently low at the cooling temperature, on its surface and pump the gas. Gas, vapor pressure of which is not sufficiently low at the cooling temperature of the baffle 32, passes through the baffle 32 to enter the inside of the heat shield 16. Among the gas molecules thus entering the inside, gas (e.g., argon), vapor pressure of which is sufficiently low at the cooling temperature of the panel assembly 14, is condensed on the surface of the structure 14 to be pumped. Gas (e.g., hydrogen), vapor pressure of which is not sufficiently low at the cooling temperature, is adsorbed by an adsorbent, which is attached to the surface of the panel assembly 14 and cooled, and pumped. Thus, the cryopump 10 can enhance the degree of vacuum inside the vacuum chamber 80 to a required level.

Figure 3:
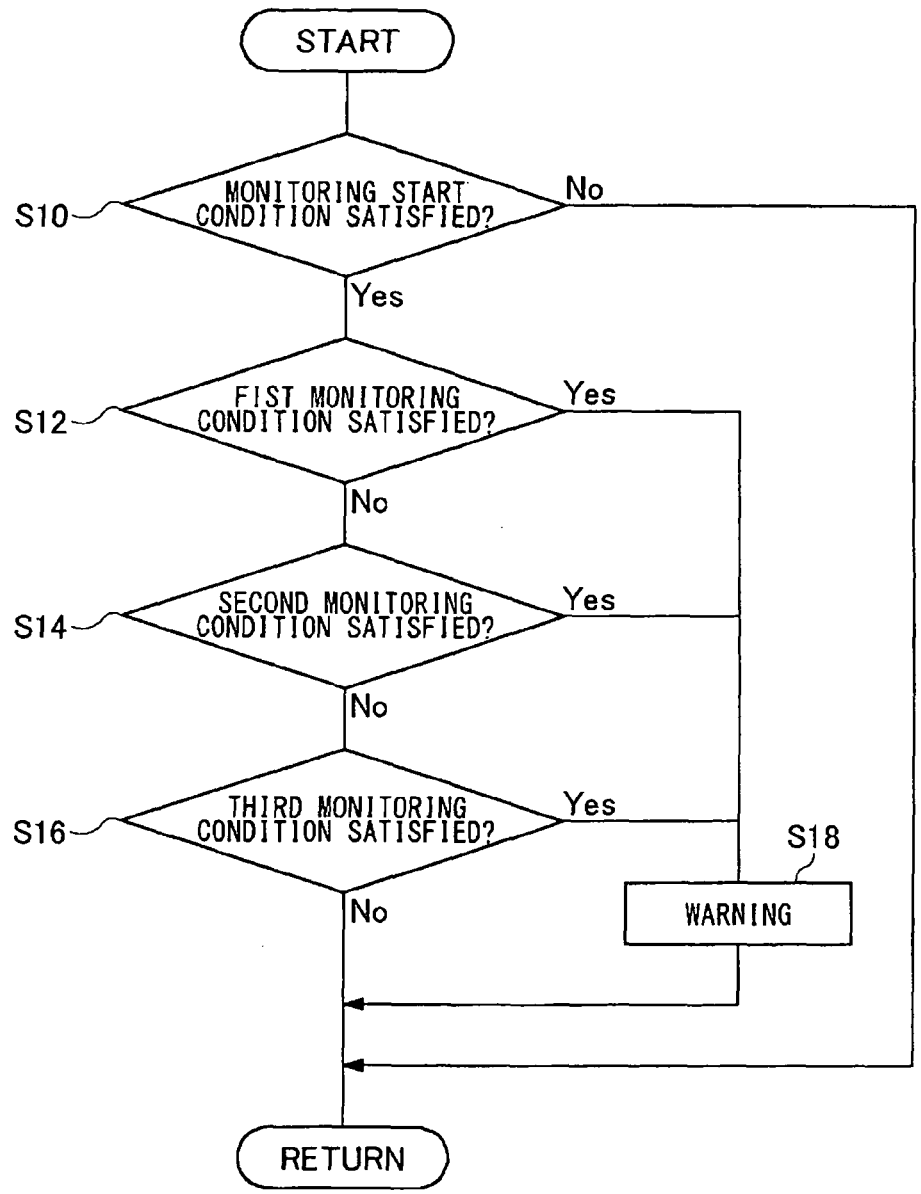
FIG. 3 is a flowchart illustrating an example of monitoring processing according to the present embodiment.

FIG. 3 is a flowchart illustrating an example of monitoring processing according to the present embodiment. The processing illustrated in FIG. 3 is repeatedly performed at a predetermined cycle by the CP controller 100 during an operation of the cryopump 10. In short, the CP controller 100 outputs a warning when any one of the first to the third monitoring conditions is satisfied while a monitoring start condition is being satisfied. Although in the processing illustrated in FIG. 3, the first to the third monitoring conditions are sequentially determined in series, the order of determination may be arbitrarily interchanged with each other, or each monitoring condition may be determined in parallel. Alternatively, any one of the first to the third monitoring conditions may be omitted. For example, the CP controller 100 may omit the third monitoring condition to determine the first and the second monitoring conditions. In contrast, the CP controller 100 may omit the first and the second monitoring conditions to determine only the third monitoring condition.

The CP controller 100 at first determines whether a monitoring start condition is satisfied (S10). Herein, the monitoring start condition is satisfied when an operation mode of the cryopump 10 is in a T1 temperature control. An operation mode of the cryopump 10 is normally in the T1 temperature control mode, while in an operation of evacuating the vacuum chamber 80. The T1 temperature control means that the refrigerator 12 is controlled such that the temperature T1 of the first stage cryopanel (namely, heat shield 16) will become a target temperature of the first stage. When it is determined that the monitoring start condition is not satisfied (S10/N), the CP controller 100 ends the processing without monitoring an operation state of the cryopump. Accordingly, when the cryopump 10 is, for example, in a stopped state or in a regenerative operation, the CP controller 100 does not perform the monitoring processing of the cryopump 10.

At the start of an operation, the cryopump 10 is at first driven in a cool-down step, then transferred to a pumping operation. It is desirable that the cryopanel is rapidly cooled in the cool-down step. Accordingly, the CP controller 100 may be operated so as to perform a T2 temperature control in the cool-down step and switched to perform the T1 temperature control when the second stage cryopanel is cooled to approximately a second stage target temperature. The T2 temperature control is a control in which the second stage cryopanel (namely, panel assembly 14) is cooled to a second stage target temperature. In this case, the first stage cryopanel is sometimes cooled to a lower temperature than the first stage target temperature when switching to the T1 temperature control. Accordingly, the CP controller 100 may set the monitoring start condition as such that an operation mode of the cryopump is in the T1 temperature control and a predetermined waiting period of time has passed since the switching to the T1 temperature control. The waiting period of time may be set to the period of time necessary for the temperature of the first stage cryopanel to be stabilized at a temperature near the first stage target temperature. In the following descriptions, a state in which the waiting period of time has passed and the operation mode is in the T1 temperature control is sometimes referred to as a "T1 stable state".

When it is determined that the monitoring start condition is satisfied (S10/Y), the CP controller 100 determines whether the first monitoring condition is satisfied (S12). The first monitoring condition is that the temperature of the second stage cryopanel is raised to the alert temperature. The alert temperature is determined in conjunction with a malfunction determination temperature set in the vacuum apparatus in which the cryopump 10 is installed. The alert temperature is set to a lower temperature so as to as have an appropriate margin to the malfunction determination temperature in the vacuum apparatus. For example, when the malfunction determination temperature in the vacuum apparatus is 20 K, the alert temperature is set to be 18 K. When it is determined that the first monitoring condition is satisfied (S12/Y), the CP controller 100 outputs a warning (S18). With such a structure, the CP controller 100 can detect that the temperature of a cryopanel approaches the maximum temperature before the temperature thereof is actually raised to the maximum temperature of a cryopanel in the vacuum apparatus.

When it is determined that the first monitoring condition is not satisfied (S12/N), the CP controller 100 determines whether the second monitoring condition is satisfied (S14). When it is determined that the second monitoring condition is satisfied (S14/Y), the CP controller 100 outputs a warning (S18).

The second monitoring condition is that the temperature of the second stage cryopanel is continuously being raised to a temperature within a cautionary temperature range for a preset period of time or longer. The CP controller 100 starts timing when the temperature of the second stage cryopanel has newly been raised to a temperature within the cautionary temperature range in the monitoring processing of this time. In the subsequent monitoring processing, the CP controller 100 determines whether the temperature of the second stage cryopanel remains in the cautionary temperature range. When remaining in the cautionary temperature range, the CP controller determines whether the elapsed time exceeds the preset period of time. When exceeding the preset period of time, the CP controller 100 determines that the second monitoring condition is satisfied. When the temperature of the second stage cryopanel returns to a temperature lower than the cautionary temperature range in the subsequent monitoring processing, the CP controller resets the count of the elapsed time and determines that the second monitoring condition is not satisfied.

The preset period of time is set to, for example, approximately tens of minutes to several hours. The cautionary temperature range is one, the maximum of which is the alert temperature and the minimum of which is a cautionary temperature. The cautionary temperature is set to a temperature higher than or equal to the maximum of a process assured temperature zone in which it is assured that the vacuum process is normally performed. The cautionary temperature is, for example, 12 K to 15 K. It is noted that a malfunction does not always occur immediately after the temperature of a cryopanel exceeds the process assured temperature zone.

Herein, the cautionary temperature may be included within a performance assured temperature range in which the pump performance of the cryopump 10 is assured. That is, the cryopump 10 can provide the pump performance specified in a specification even in a state in which the temperature of the second stage cryopanel has been raised to a temperature within the cautionary temperature zone. By setting the cautionary temperature in accordance with the vacuum process as stated above, suitable maintenance can be sped up even when the cryopump 10 itself is in a normal operation state. As a result, the possibility that the vacuum process may be adversely affected by the cryopump can be suppressed to a minimum.

When it is determined that the second monitoring condition is not satisfied (S14/N), the CP controller 100 determines whether the third monitoring condition is satisfied (S16). The third monitoring condition is that a state in which an increase from the minimum attained temperature of the second stage cryopanel in the initial stage of an operation of the cryopump 10 to the most recent minimum attained temperature of the second stage cryopanel exceeds an aging degradation determination threshold value, has been continued for a long period of time. When it is determined that the third monitoring condition is satisfied (S16/Y), the CP controller 100 outputs a warning (S18). When it is determined that the third monitoring condition is not satisfied (S16/N), the CP controller 100 ends the monitoring processing without outputting a warning.

The CP controller 100 beforehand memorizes the minimum attained temperature in the initial stage of an operation (hereinafter, also referred to as an "initial minimum attained temperature"). When the operating cycle of the refrigerator 12 is lower than a reference value in the T1 stable state in the initial stage of an operation of the cryopump 10, the CP controller 100 measures the temperatures of the second stage cryopanel multiple times, and memorizes the lowest temperature among them as the minimum attained temperature. Alternatively, the minimum attained temperature may be measured for a certain period of time (e.g., one week or so) after a certain period of time (e.g., one week or so) has passed since the start of an operation of the cryopump 10 installed in the vacuum apparatus, assuming is that the minimum attained temperature is not measured immediately after the start of an operation thereof.

Because a heat load from outside may be large when the operating cycle of the refrigerator 12 is high, it is expected that the temperature of a cryopanel does not become too low. Accordingly, in order to obtain a real minimum attained temperature, it is desirable to measure it when the operating cycle of the refrigerator 12 is smaller than a reference value. The operating cycle reference value may be made to be the maximum operating cycle expected during a pumping operation (or during a non-load operation) in the vacuum process, or be a value obtained by adding an appropriate margin to the maximum operating cycle. The effect of the description stated above is, in other words, the minimum attained temperature is not measured while baking processing is being executed in the vacuum apparatus. Because the vacuum apparatus is heated during baking processing, there is an tendency in which the operating cycle of the refrigerator becomes high. It is noted that so-called idle baking may be included in the baking processing in which not only an occluded gas, etc., is discharged by heating a vacuum chamber, but also the vacuum apparatus is maintained in a warming-up state.

Further, the CP controller 100 measures the minimum attained temperature during a pumping operation under the same condition as that when the initial minimum attained temperature is measured. That is, when the operating cycle of the refrigerator 12 is lower than a reference value in the T1 stable state, the CP controller 100 measures and memorizes the temperature of the second stage cryopanel. When an increase from the initial minimum attained temperature to the measured minimum attained temperature exceeds the aging degradation determination threshold value, the CP controller 100 starts timing. The CP controller 100 determines, in the subsequent monitoring processing, whether an increase in the most recent measured minimum attained temperature continuously exceeds the aging degradation determination threshold value. When exceeding the threshold value, the CP controller 100 determines whether the elapsed time exceeds the aging degradation determination period of time. When exceeding the determination period of time, the CP controller 100 determines that the third monitoring condition is satisfied. When an increase in the minimum attained temperature measured in the subsequent monitoring processing has returned to a value smaller than the aging gradation determination threshold value, the CP controller resets the count of the elapsed time and determines that the third monitoring condition is not satisfied.

Herein, the aging degradation determination temperature, obtained by combining the initial minimum attained temperature with the aging degradation determination threshold value, may be included within the vacuum process assured temperature zone, or within the performance assured temperature zone in which the pump performance of the cryopump 10 is assured. That is, even if the most recent minimum attained temperature of the second stage cryopanel is increased to the aging degradation determination temperature, the vacuum process is not at all affected by the cryopump 10 at the time, and the cryopump 10 can provide the pump performance specified in a specification. The aging degradation determination threshold value can be set to a value that is empirically and experimentally appropriate, for example, to a value from 2K to 5K.

An individual difference of each cryopump 10 is reflected on the initial minimum attained temperature. It is because the initial minimum attained temperature is measured with respect to each cryopump 10 after each cryopump 10 has been installed in the vacuum apparatus and its operation has been initialized. As the cryopump 10 has good performance, the initial minimum attained temperature becomes low. There is a tendency in which the minimum attained temperature is gently increased as the accumulative operating period of time of a cryopump becomes long. Accordingly, a cryopump having good performance can be used for a long period of time before the minimum attained temperature is raised to the aforementioned cautionary temperature zone, with an error between the most recent minimum attained temperature and the initial minimum attained temperature being increased.

When an error from the initial minimum attained temperature becomes large, it can be thought that aging degradation of the cryopump 10 is in progress. In such a case, there is the fear that a malfunction may accidentally occur in the cryopump 10 at worst due to accumulation of the aging degradation, without any sign from the monitoring of a vacuum process by using the controller of the vacuum apparatus. If a malfunction occurs in the cryopump 10, down time of the vacuum apparatus may be incurred, which is not desirable. However, by monitoring the cryopump 10 by using the aforementioned third monitoring condition, it can be detected that an error from the initial minimum attained temperature has been expanded. Accordingly, it is desirable because maintenance of the cryopump can be sped up before an adverse influence on the vacuum process comes to the surface, or before accidental down time occurs in the vacuum apparatus.

Further, it is desirable that the aging degradation determination period of time is longer than, for example, the preset period of time of the second monitoring condition, and is more desirable that the aging degradation determination period of time is longer than the period of time necessary for the baking processing of the vacuum apparatus. By making the aging degradation determination period of time longer than the period of time necessary for the baking processing, it can be avoided that an increase in the temperature, occurring due to heat input during the baking processing, may be mistaken for an increase in the temperature, occurring due to aging degradation. When the aging degradation determination period of time is made shorter than the period of time necessary for the baking processing, the CP controller 100 may be configured to output a warning, assuming that aging degradation actually occurs when the third monitoring conditions are continuously satisfied multiple times.

What is claimed is:

1. A cryopump for pumping gas from a vacuum chamber in a vacuum apparatus performing vacuum processing, the vacuum apparatus provided with a vacuum apparatus controller for executing the vacuum processing, the cryopump comprising:
    a first stage cryopanel;
    a first temperature sensor that measures a temperature of the first stage cryopanel;
    a second stage cryopanel cooled to a lower temperature than the first stage cryopanel in conjunction with the temperature of the first stage cryopanel;
    a second temperature sensor that measures the temperature of the second stage cryopanel; and
    a cryopump controller configured to perform a cool-down step in which the second stage cryopanel is cooled to a temperature less than 20K and a subsequent normal pumping operation of the cryopump after completion of the cool-down step, the normal pumping operation including controlling the first stage cryopanel to have a target temperature,
    wherein the cryopump controller is provided apart from the vacuum apparatus controller and communicatably connected with the vacuum apparatus controller,
    wherein the vacuum apparatus controller sets a maximum cryogenic temperature of the second stage cryopanel for the vacuum processing, and the cryopump controller sets an alert temperature that is irrespective of the measured temperature of the second stage cryopanel based on the maximum cryogenic temperature,
    wherein the cryopump controller performs, while controlling the first stage cryopanel to have the target temperature during the subsequent normal pumping operation:
    a first determination in which the cryopump controller compares the measured temperature of the second stage cryopanel with the alert temperature and determines whether the measured temperature of the second stage cryopanel is higher than or equal to the alert temperature set to be lower than the maximum cryogenic temperature of the second stage cryopanel set in the vacuum apparatus, wherein the alert temperature is less than 20K; and
    a second determination in which it is determined whether the second stage cryopanel is continuously being heated, for a preset period of time or longer, to a temperature within a temperature range set on condition that the alert temperature is a maximum,
    wherein, when it is determined that the measured temperature of the second stage cryopanel is higher or equal to the alert temperature in the first determination, the cryopump controller allows the normal pumping operation to continue.

2. The cryopump according to claim 1, wherein the minimum of the temperature range is set to be higher than a temperature zone in which it is assured that the vacuum processing is normally performed.

3. The cryopump according to claim 1, wherein the cryopump controller performs, while controlling the first stage cryopanel to have the target temperature, a third determination in which it is determined whether a state where an error between the temperature of the second stage cryopanel during the normal pumping operation and a minimum attained temperature of the second stage cryopanel measured in an initial stage of an operation of the cryopump occurs, has been continued for a continued period of time or longer, the continued period of time being set to be longer than the preset period time,
    wherein the minimum attained temperature of the second stage cryopanel is lower than the temperature of the second stage cryopanel during the normal pumping operation.

4. The cryopump according to claim 3, wherein a reference temperature by which it is determined whether the error between the temperature of the second stage cryopanel during a pumping operation and the minimum attained temperature of the second stage cryopanel occurs, is set to be lower than the minimum of the temperature range.

5. The cryopump according to claim 3, wherein the continued period of time is set to be longer than a period of time necessary for baking processing of the vacuum apparatus.

6. The cryopump according to claim 3, further comprising a refrigerator configured to generate a cold state by repeating heat cycles to cool the first stage and second stage cryopanels, wherein the cryopump controller performs the third determination by using a temperature of the second stage cryopanel, measured while the refrigerator is being operated at a cycle lower than the operating cycle of the refrigerator, the operating cycle being assumed to occur during a baking processing of the vacuum apparatus.

7. A method of monitoring a cryopump that evacuates a vacuum apparatus performing vacuum processing, the vacuum apparatus provided with a vacuum apparatus controller for executing the vacuum processing,
    wherein the cryopump is provided with a cryopump controller apart from the vacuum apparatus controller and communicatably connected with the vacuum apparatus controller,
    wherein the vacuum apparatus controller sets a maximum cryogenic temperature of a low-temperature cryopanel for the vacuum processing, and the cryopump controller sets an alert temperature that is irrespective of the measured temperature of the low-temperature cryopanel based on the maximum cryogenic temperature,
    wherein it is determined, while controlling a high-temperature cryopanel to have a target temperature, whether the temperature of the low-temperature cryopanel cooled in conjunction with the high-temperature cryopanel approaches the maximum cryogenic temperature of the low-temperature cryopanel set in the vacuum apparatus, and wherein, when it is determined, while controlling the temperature of the high-temperature cryopanel, that the temperature of the low-temperature cryopanel does not approach the maximum cryogenic temperature, it is determined whether an error between the temperature of the low-temperature cryopanel and a temperature zone in which it is assured that the vacuum processing is normally performed, continuously occurs, wherein the controlling the high-temperature cryopanel to have the target temperature occurs during a subsequent normal pumping operation after completion of a cool-down step in which the low-temperature cryopanel is cooled to a temperature less than 20K, wherein the determination whether the temperature of the low-temperature cryopanel approaches the maximum cryogenic temperature includes a first determination in which the cryopump controller compares a measured temperature of the low-temperature cryopanel with the alert temperature and determines whether the measured temperature of the low-temperature cryopanel is higher than or equal to the alert temperature set to be lower than the maximum cryogenic temperature, wherein the alert temperature is less than 20K, wherein, when it is determined that the measured temperature of the low-temperature cryopanel is higher or equal to the alert temperature in the first determination, the cryopump controller allows the normal pumping operation to continue.

8. The method of monitoring a cryopump according to claim 7, wherein it is determined whether a state in which an error between the temperature of the low-temperature cryopanel in the cryopump and the minimum attained temperature of the low-temperature cryopanel occurs, has been continued for a long period of time exceeding a determination reference period of time by which it is determined that an error between the temperature of the low-temperature cryopanel and the temperature zone has continuously occurred.

9. The cryopump according to claim 1, wherein, when it is determined that the measured temperature of the second stage cryopanel is higher or equal to the alert temperature in the first determination, the cryopump controller allows the normal pumping operation to continue until the measured temperature of the second stage cryopanel increases to the maximum cryogenic temperature of the second stage cryopanel set in the vacuum apparatus.

10. The cryopump according to claim 1, wherein, when it is determined that the measured temperature of the second stage cryopanel is higher or equal to the alert temperature in the first determination, the cryopump controller allows the normal pumping operation to continue to a next maintenance of the cryopump according to a planned process schedule of the vacuum apparatus or to an accidental malfunction of the cryopump before the next maintenance.

11. The cryopump according to claim 1, further comprising a refrigerator comprising a first cooling stage and a second cooling stage that cools the first stage cryopanel and the second stage cryopanel, respectively, wherein the first temperature sensor is mounted on the first cooling stage and the second temperature sensor is mounted on the second cooling stage.

* * * * *